United States Patent [19]

Wizgall et al.

[11] Patent Number: 6,128,502
[45] Date of Patent: Oct. 3, 2000

[54] METHOD OF SELECTING ONE OF AT LEAST TWO COMMUNICATIONS TERMINALS, AND A COMMUNICATIONS TERMINAL THEREFOR

[75] Inventors: Manfred Wizgall; Axel Kuttner, both of Stuttgart, Germany

[73] Assignee: Alcatel N.V., Rijswijk, Netherlands

[21] Appl. No.: 08/596,269

[22] PCT Filed: Jun. 12, 1995

[86] PCT No.: PCT/EP95/02264

§ 371 Date: May 6, 1996

§ 102(e) Date: May 6, 1996

[87] PCT Pub. No.: WO95/34985

PCT Pub. Date: Dec. 21, 1995

[30] Foreign Application Priority Data

Jun. 13, 1994 [DE] Germany .............................. 44 20 462

[51] Int. Cl.⁷ .............................. H04M 3/42; H04Q 7/38
[52] U.S. Cl. ............................................ 455/461; 455/415
[58] Field of Search ...................................... 455/461, 456, 455/458–459, 31.2–31.3, 424–425, 414, 415, 559, 563, 558; 340/825.44; 379/211

[56] References Cited

U.S. PATENT DOCUMENTS

| | | | |
|---|---|---|---|
| 4,680,785 | 7/1987 | Akiyama et al. | 379/57 |
| 4,739,328 | 4/1988 | Koelle et al. | 342/44 |
| 4,864,158 | 9/1989 | Koelle et al. | 307/231 |
| 5,030,807 | 7/1991 | Landt et al. | 235/375 |
| 5,055,659 | 10/1991 | Hendrick et al. | 235/439 |
| 5,197,092 | 3/1993 | Bamburak | 379/59 |
| 5,416,780 | 5/1995 | Patel | 370/95.3 |
| 5,428,663 | 6/1995 | Grimes et al. | 379/57 |

FOREIGN PATENT DOCUMENTS

| | | | |
|---|---|---|---|
| 0264092 | 4/1988 | European Pat. Off. . | |
| 520 194 A3 | 5/1992 | European Pat. Off. | 455/417 |
| 0536949 | 4/1993 | European Pat. Off. . | |
| 0520194 | 12/1993 | European Pat. Off. . | |
| 2198910 | 6/1988 | United Kingdom . | |
| 2222503 | 3/1990 | United Kingdom . | |
| 2254755 | 10/1992 | United Kingdom . | |
| 9310616 | 5/1993 | WIPO . | |

OTHER PUBLICATIONS

International Search Report (7 pages) plus a translation of the "Special Categories" (1 page).
Derwent abstract of EP 48868 (1 page).
Abandoned U.S. patent application Serial No. 07/986,591.
Patent Abstracts of Japan 61–95693 and Japanese Patent Application No. 59–216835 filed Oct. 16, 1984.
Patent Abstracts of Japan No. 58–164361 and Japanese Patent Application No. 57–47583, filed Mar. 25, 1982.
Patent Abstracts of Japan Kokai No. 54–114019 and Japanese Patent Application No. 53–21273 filed Feb. 25, 1978.
"Personal Communication, Concept and Architecture", T. Hattori et al, *IEEE International Conference on Communications/ICC'90*, Atlanta, GA, Apr. 15–19, 1990, vol. 2, pp. 335.4.1 to 335.4.7.

(List continued on next page.)

*Primary Examiner*—Salvator Cangialosi

[57] ABSTRACT

A method and terminal for use in a telecommunications infrastructure which allows a call directed to a particular subscriber to be taken selectively at one of at least two separate terminals, has the subscriber identify himself to at least one of the terminals through a subscriber identity card, or the like, which can be detected within a limited space associated with the environment of one of the terminals. The subscriber 10 registers all his terminals 11, 12 (home, office, car, hand-held) with a service operator 3. Each terminal which detects the subscriber's proximity in the associated space or environment signals this to the service operator 3. Calls directed to the subscriber are routed to the service operator and from the latter to the terminal which has signaled last, or which is selected according to an algorithm, depending on the sensed signal. In this way, an automatic changeover is accomplished without restricting the subscriber's freedom.

14 Claims, 4 Drawing Sheets

OTHER PUBLICATIONS

"System 900: The ISDN Approach to Cellular Mobile Radio", W. Weiss et al, *Electrical Communications,* vol. 63, No. 4, 1989, pp. 400–408.

"The German Cellular Radiotelephone System C", K. Spindler, *IEEE Communications Magazine,* vol. 24, No. 2, Feb. 1986, pp. 22–29.

"Advanced Personal Communication System", K. Kohiyama et al, 1990 IEEE, CH2846–4/90, pp. 161–166.

"Characteristics of the Cellular Mobile Radio System C450", K. Kammerlander, Telcom Report 4/85, vol. 8, Jul./Aug. 1985, pp. 209–214.

"The Building of Intelligent Networks, Architecture and Systems from Alcatel", J. Dunogue et al, *Commutation & Transmission,* No. 2, 1989, pp. 5–22.

"The Public Network Gets Personal", C. Wilson, *Telephony's Supercomm Wrap–up,* Apr. 1991, pp. 30–33.

METHOD OF SELECTING ONE OF AT LEAST TWO COMMUNICATIONS TERMINALS, AND A COMMUNICATIONS TERMINAL THEREFOR

TECHNICAL FIELD

The invention concerns a method of selecting one of at least two communications terminals assigned or assignable to the same subscriber, and a communications terminal, particularly a telephone terminal, for carrying out this method.

BACKGROUND OF THE INVENTION

In a conventional telephone network, each subscriber has a telephone terminal at which he can be reached in a specific location by means of a specific telephone number. In the final analysis, the telephone number is not assigned to the subscriber, but rather to the location. On the one hand, this subscriber cannot be reached with "his" number if he is located in a different place, and on the other, different persons, perhaps family members, can be reached with this number, although they are not listed in the telephone directory.

By contrast, in the mobile radio network, the site at which the subscriber's mobile radio set is located can always be reached by means of a specific telephone number, and thereby often the subscriber himself. Still, most mobile radio subscribers also have a "fixed network set", and thus a second telephone number in addition to the mobile radio set, mainly for reasons of cost. A caller has to know which of the two numbers he must dial. In practice, this is often done by trial and error. Technical solutions are also known for the trial and error method. In that case, every call that is not answered by a first terminal is switched to a second terminal after a predetermined time (e.g. after three rings), then perhaps even to a third terminal, or back to the first.

Solutions are also known whereby the subscriber must report to a central of some kind, at which terminal he is presently located. Calls to the subscriber are then switched to his central, from where they are routed to the selected terminal. The present invention starts with such a communications infrastructure, and builds on it.

The problem on which the present task is based is to reduce the cost to the subscriber of switching between the terminals under consideration.

DISCLOSURE OF INVENTION

According to the present invention, a method of terminals under consideration.

According to the present invention, a method of its environment, and that upon detection of such a signal, the assignment of said communications terminal to the subscriber is initiated.

According to a second aspect of the present invention, a communications terminal, particularly a telephone terminal, is characterized in that it has a sensor for receiving subscriber environment, e.g., by means of a space-limited subscriber identification card that can be remotely detected by at least one of the terminals, which then sends a message to the central, causing any incoming call intended for the subscriber to be routed to this terminal.

These and other objects, features and advantages of the present invention will become more apparent in light of the detailed description of a best mode embodiment thereof, as illustrated in the accompanying drawings.

BEST MODE FOR CARRYING OUT THE INVENTION

Figure 1:
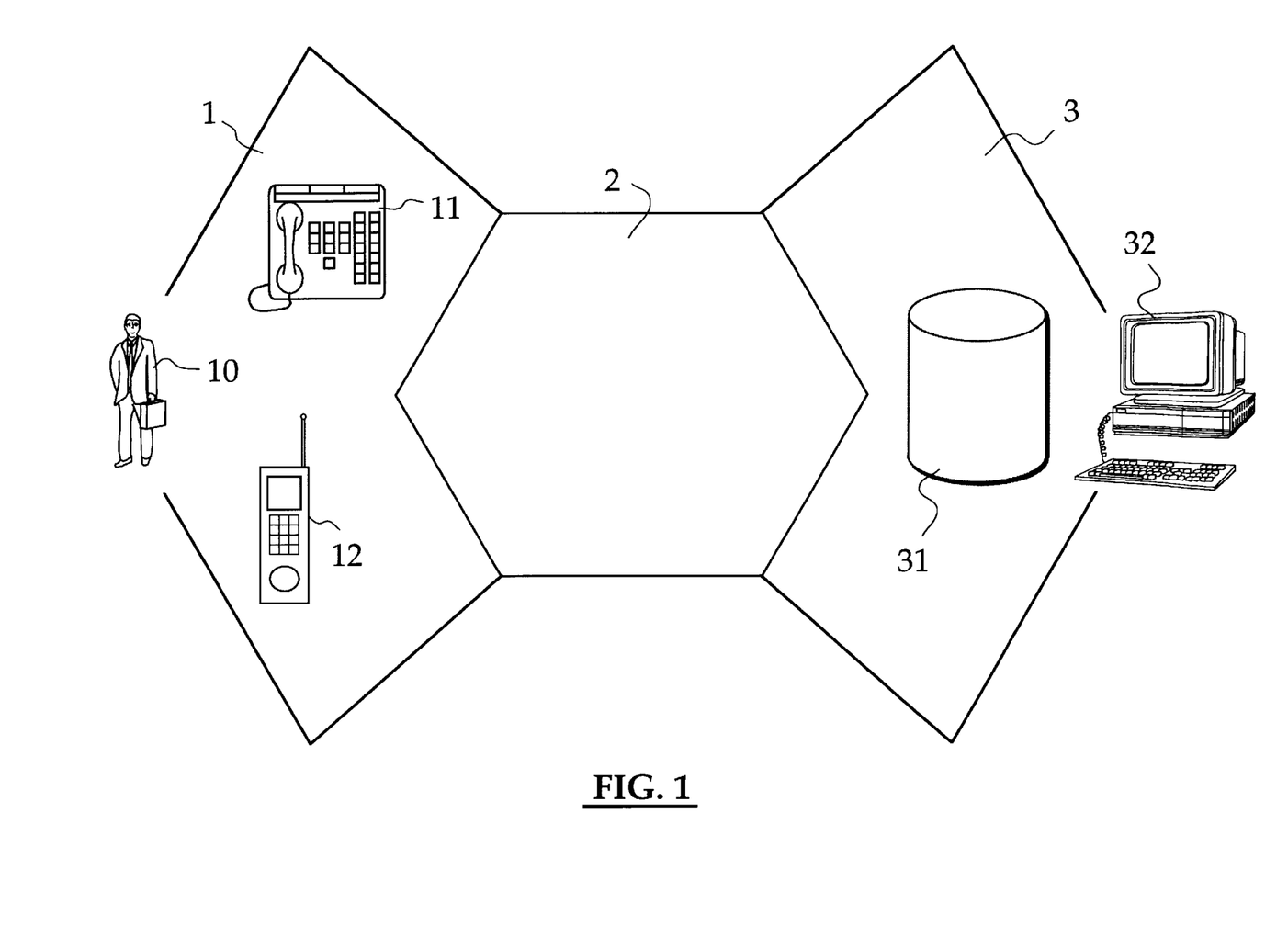
FIG. 1 shows a subscriber in a subscriber range, along with a stationary telephone set and a hand-held telephone for use by the subscriber, wherein a service operator range is signaled by one of the terminals in the subscriber range via a network range, which telecommunications terminal is presently associated with the subscriber, according to the invention.

The drawing depicts a subscriber range 1, a network range 2 and a service operator range 3. The subscriber 10, his stationary telephone set 11 and his hand-held telephone 12 are drawn in the subscriber range 1. The service operator range 3 is symbolized by a data bank 31 and a data terminal 32. The data terminal 32 is not mentioned any further in the following; it is not required for continuous operation.

The telephone set 11 as well as the hand-held telephone 12 and the service operator range 3 can be interconnected in the network range 2, which in the final analysis comprises the entire worldwide communications network.

In the known manner, the telephone set 11 and the hand-held telephone 12 can be reached with different numbers, which as a rule can be reached with different discriminating The subscriber 10 can be reached by dialing the discriminating identification numbers of the service operator range 3, and the number assigned to the subscriber within the service operator range 3. With the aid of the data about the subscriber contained in the data bank 31, the call is now routed either to the telephone set 11 or to the hand-held corresponding data to the requesting exchange in the network range 2, which controls the completion of the call. So far, the invention does not differ from what is known. Therefore, details in that regard are not necessary.

For the sake of simplicity it is assumed, and this makes perfect sense in practice, that as a result of an entry into the data bank 31, it is the hand-held telephone 12 that is always chosen by default from the two terminals 11 and 12 under consideration, if no message has been signalled by the telephone set 11 that the subscriber 10 is located in its vicinity. Thus, referring to FIG. 2, after the subscriber is not sensed in a step 10a, as determined in a step 12a, the hand-held telephone 12 is chosen from the two terminals 11, 12 under consideration as the terminal which will receive incoming telephone calls, as indicated in a step 14.

Figure 3:
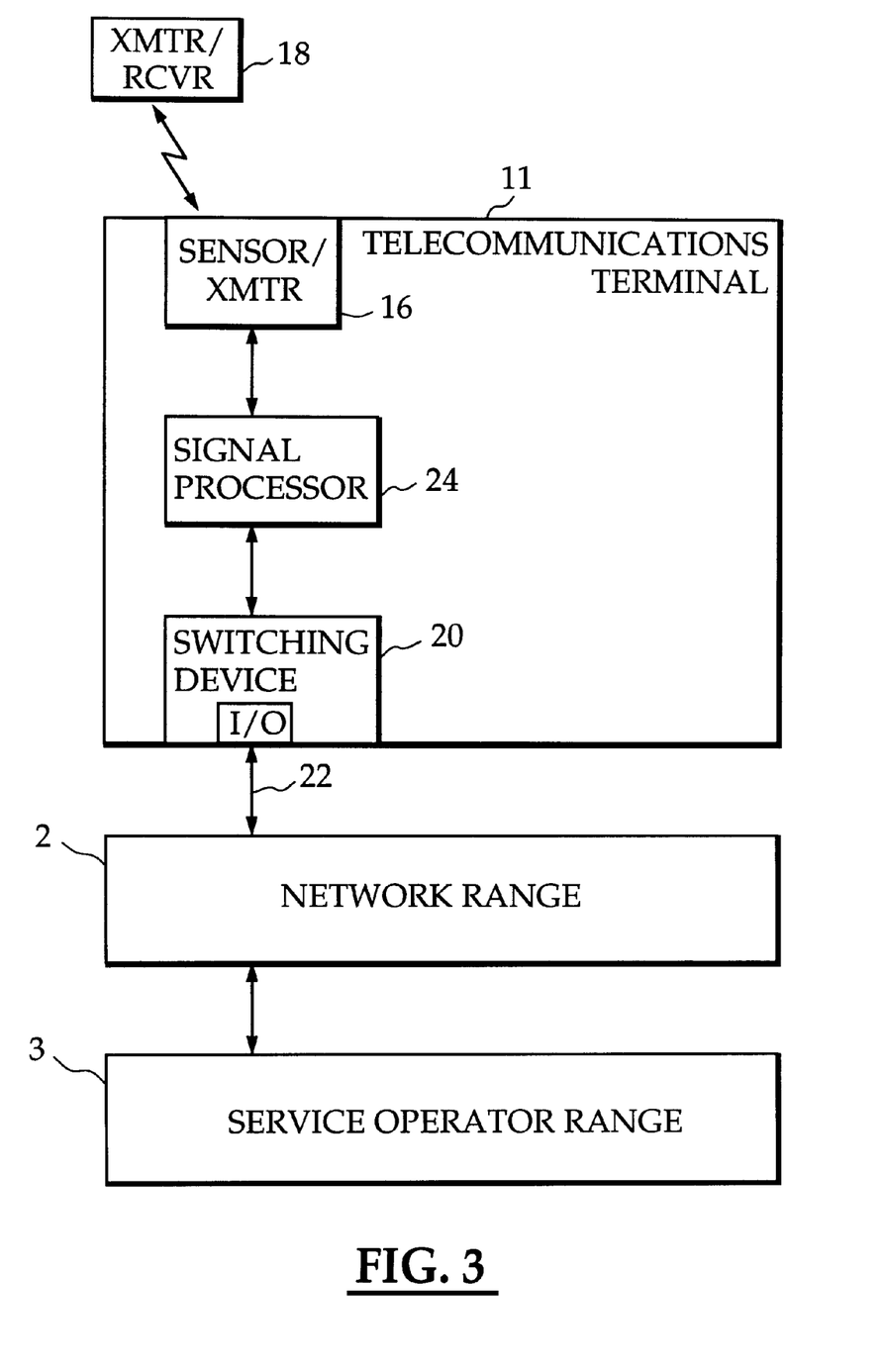
FIG. 3 shows a telecommunications terminal 11, particularly a telephone terminal, that has a sensor for receiving subscriber identification signals from its environment, according to the present invention.

The telephone set 11 is configured, as shown in FIG. 3, so that it contains a sensor 16 for receiving subscriber identification signals from a device 18 from an associated environment, and so that it contains a switching device which, as a reaction to the reception of subscriber identification signals, releases a message on a line 22 to the service operator range 3. This may be done through a signal processor 24 in the telephone set 11, or the sensor may be connected directly to the switching device. Messages routed from the telephone set (11) to the service operator range 3 via the network range 2 can be log-ons and log-offs; the momentary condition is retained by the telephone set 11 and by the data bank 31.

Figure 2:
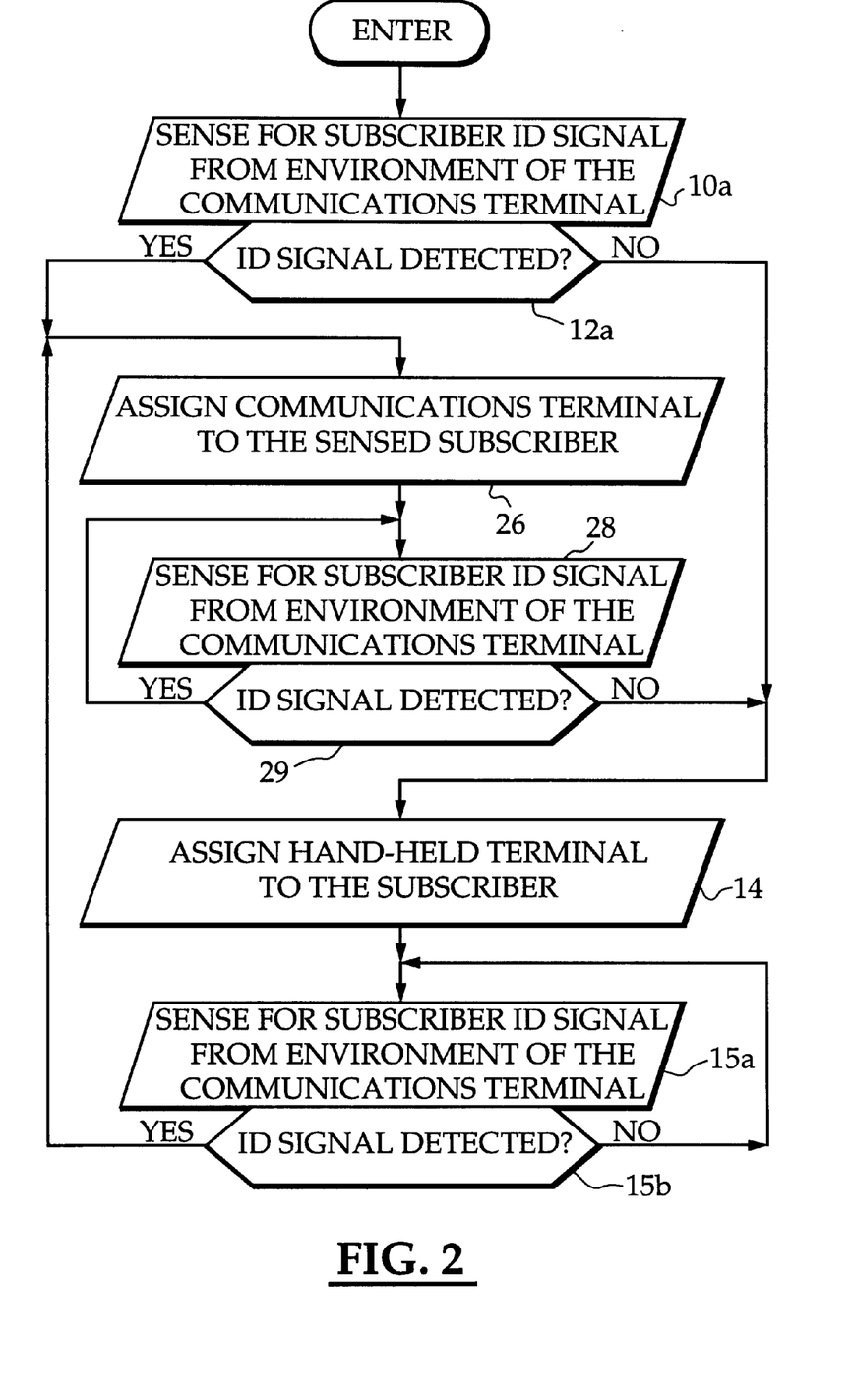
FIG. 2 shows a method of selecting one of at least two communications terminals assigned or assignable to a same subscriber, according to the present invention.

Referring back to FIG. 2, assuming the steps 10a, 12a, 14 have been executed in the signal processor 24 of FIG. 3, without the subscriber having been sensed, the hand-held terminal 12 will continue to be assigned to the subscriber, as indicated in steps 15a, 15b. The signal processor can be a general purpose digital signal processor that contains a central processing unit (CPU), a random access memory (RAM), and read-only memory (ROM), and input/output (I/O) device, all interconnected by various data, address and control buses, as will be known to one of skill in the art. Such a signal processor can store sets of instructions in the ROM for carrying out steps such as shown in FIG. 2.

Assuming now that the subscriber 10 enters into the associated environment of the telecommunications terminal 11, and the sensor 16 senses a signal transmitted from the transmitter 18. In that case, an identification signal is detected in the step 15a of FIG. 2, as determined in the step 15b, and a step 26 is executed by the signal processor and/or switching device 20 to assign the telecommunications terminal 11 to the sensed subscriber 10, as illustrated in the step 26.

Referring back to FIG. 3, sensors which react to identification signals are known for the most varied purposes; many of the known solutions can be applied in this case. Some examples are product protection installations operating on an inductive basis, badge identification systems for freight containers or railroad cars operating on a radio basis (as described e.g. in U.S. Pat. Nos. 4,739,328; 4,864,158; 5,030,807 and 5,055,659) or detection systems that operate on an infrared basis or on an ultrasound basis, as well.

The subscriber's voice could be used as the "identification" in the subscriber identification signal. Microphones built into telephones as part of an intercom system are also known, as well as built-in voice recognition devices for voice-controlled usage. The invention could already be carried out in this way in the subscriber range 1 at very little cost (additional software).

If the subscriber does not identify himself by means of his voice or other identifying personal characteristic such as his appearance on a video telephone set, but carries some remotely accessible unit as his identification card, the telephone set 11 must contain a suitable generator which produces a field that causes this "identification card unit" carried by the subscriber 10 to transmit subscriber identity signals. In that case the device 18 can be a transmitter/receiver, and likewise the sensor 16 can also be a transmitter. Depending on the detection system being used, this is a magnetic field generator, an HF transmitter, an infrared or ultrasound transmitter, or even the loudspeaker of an intercom system. It is known from product protection installations to change an applied magnetic field only passively for example, and then to detect this change. With the cited badge identification system, the received HF energy is used as the energy source for transmitting a sequence of HF pulses. Some other systems contain their own batteries as the energy sources, and are excited only by outside signals or fields.

The switching devices that are required to transmit messages to the service operator range 3 regarding the presence or the absence of the subscriber from the telephone set 11, are remote monitoring devices and are sufficiently well known as such.

Figure 4:
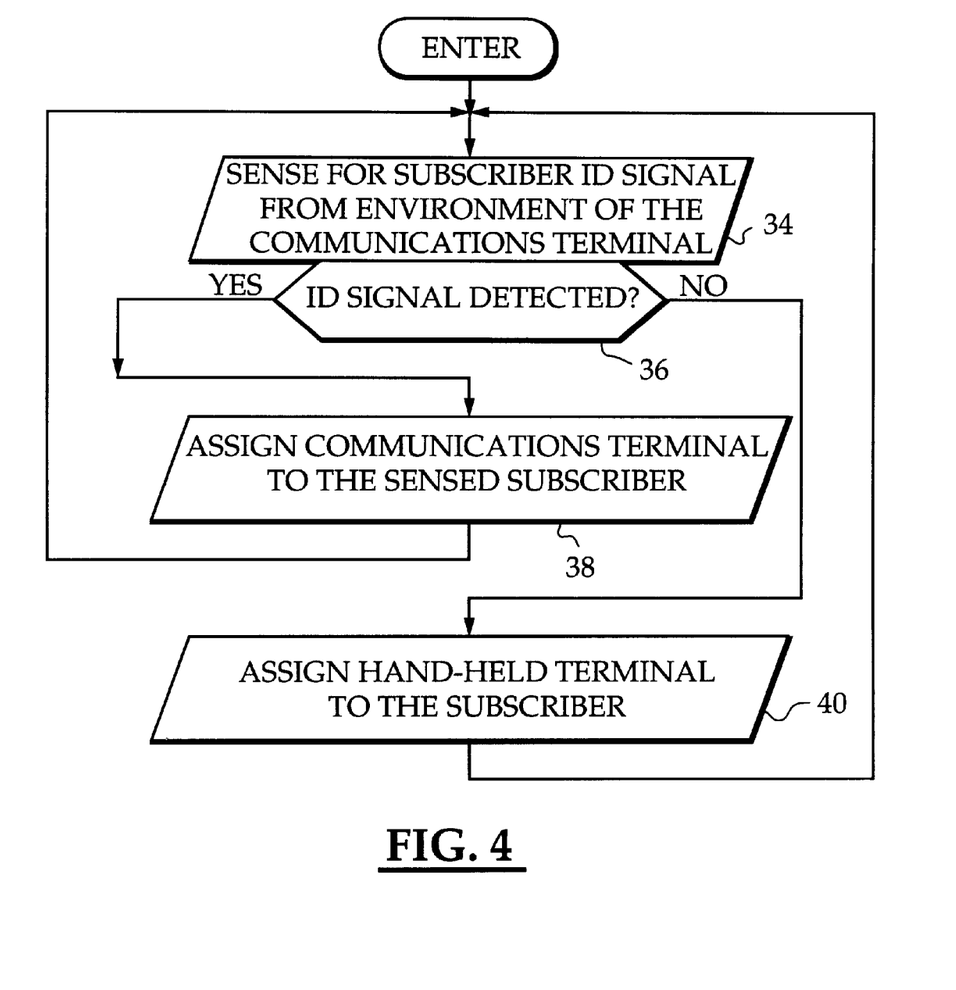
FIG. 4 shows another method of selecting one of the at least two communications terminals assignable to the same subscriber, according to the invention.

Referring back to FIG. 2, after assigning the communications terminal 11 to the sensed subscriber in the step 26, the telecommunications terminal 11 will continue to sense, as indicated in a step 28, for the presence of the subscriber identification signal within its associated environment. If the subscriber continues to be detected, as determined in a step 29, the telecommunications terminal 11 remains assigned to the sensed subscriber. If, on the other hand, the identification signal is no longer detected, as determined in the step 29, the step 14 is executed to assign the hand-held telephone set 12 to the subscriber 10. The steps 15a, 15b may then be re-executed, as illustrated. It should be realized that the steps shown in FIG. 2 do not represent the only method for selecting one of the at least two communications terminals assignable to the same subscriber. For instance, FIG. 4 shows another method whereby, after sensing for a subscriber ID signal from the environment of the communications terminal 11 in a step 34, a decision is made in a step 36 as to whether the subscriber is sensed in that environment. If so, the communications terminal 11 is assigned to the sensed subscriber in a step 38, and the sensing and deciding steps 34, 36 are repeated. If the step 36 determines that the subscriber is no longer sensed in the environment of the communications terminal 11, a step 40 is executed to assign the hand-held terminal 12 to the subscriber. The sensing and decision steps 34, 36 are then re-executed. Numerous other variations of the method of the present invention will, of course, be evident to one of skill in the art and, given the teachings hereof, many other algorithms and methodologies can be carried out, so that it will be understood that the methods of FIGS. 2 and 4 are not the only ways to carry out a method of selecting one of at least two communications terminals assignable to a same subscriber, according to the teachings hereof. For instance, another one of the telecommunications terminals can have a sensor, and it can be assigned to the sensed subscriber once it senses the same subscriber in its environment. The hand-held terminal may likewise have a sensor. In such cases, the steps of FIGS. 2 and 4 will be quite different, as will be appreciated by one of skill in the art.

The following provides some completion or modification possibilities:

If the subscriber has other terminals, they must also be known to the data bank 31. They must also send messages to the data bank 31 regarding the presence or the absence of the subscriber.

With this or the other terminal, the release of such messages can take place in different ways. For example, the starting of an automobile of the subscriber 10 can be interpreted as his presence in the vehicle, and can be signalled to the data bank 31 by a built-in mobile radio telephone. Incoming calls are then routed to this mobile radio telephone.

It is also known that a subscriber can announce himself to a service operator by sending a message to a central from any telephone, with the aid of a chip card or a code word, so that he can make a call from this telephone at his expense, and to be able to receive there a call made to his number. This can also be integrated into the method of the invention.

In the above named example, the hand-held telephone 12 is the terminal that is selected if no other terminal signals the presence of the subscriber 10. A telephone responder could be used as an alternative thereto, or the message could be transmitted through a pager, or a message could be left in the data bank 31, which would then be transmitted to the subscriber 10 at the first opportunity.

The function taken over by the service operator range 3 in the above named example can also be performed in the subscriber range 1 itself. The required devices could be built into the telephone set 11. If this is an ISDN device with two basic or B-channels and one data or D-channel, they could route calls arriving on the B-channel through the other B-channel to the terminal at which the subscriber can be reached. Messages are then transmitted through the D-channel.

Another simple example of the invention involves the automatic switching between two or more terminals in the same building. In that case all terminals are connected in series. Except for the last one, each terminal switches to the next terminal, as long as the presence of the subscriber 10 has not been determined. This example does not require any kind of central; nor are switching devices required for the routing of messages.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A method of selecting one of at least two telephone terminals (11, 12) assigned or assignable to a same subscriber,
    comprising the steps of
        generating, in at least a stationary one of said two telephone terminals, a field which causes a unit carried by said subscriber to transmit subscriber identification signals,
        detecting, in at least one (11) of said telephone terminals, said subscriber identification signals from said carried unit, and upon detection of such subscriber identification, routing any incoming telephone call intended for said subscriber to that telephone terminal where such detection most recently occurred.

2. A method as claimed in claim 1, wherein
    the at least one telephone terminal (11) reports a detection of a subscriber identification signal to a center (3),
    calls directed to the same subscriber (10) are reported to the center (3), and
    based on reports received, the center (3) selects one of said at least two telephone terminals (11, 12) and causes the calls to be routed to said telephone terminal.

3. A telecommunications terminal (11), having
    a sensor (16) for receiving and detecting subscriber identification signals from a device carried on the person of a subscriber to personally identify the subscriber and detect presence of the subscriber in the vicinity of said terminal (11), and
    a switching device (20), coupled to an output of said sensor, for initiating an assignment of the telecommunications terminal (11) to said subscriber, for routing of calls to said terminal, upon receipt of a subscriber identification signal.

4. A telecommunications terminal (11) as claimed in claim 3, characterized in that
    it has a transmitter (XMTR) for generating a field, due to which a unit (18) carried by a subscriber (10) is caused to transmit subscriber identification signals.

5. A telecommunications terminal (11) as claimed in claim 3, characterized in that
    the switching device includes a means for transmitting a message via a communications network (2) to a center (3).

6. Method of selecting one of at least two communications terminals (11, 12) assignable to a same subscriber, comprising the steps of:
    (a) sensing (34) for a subscriber identification (ID) signal in an environment of a first one (11) of said communications terminals and determining (36):
        (i) said ID signal is sensed and executing a step (b); or
        (ii) said ID signal is not sensed and executing a step (c);
    (b) assigning (38) said first one of the communications terminals to said same subscriber and re-executing step (a); and
    (c) assigning (40) a second one (12) of said communications terminals to said same subscriber and re-executing step (a).

7. Method of selecting one of at least two communications terminals (11, 12) assignable to a same subscriber, comprising the steps of:
    (a) sensing (10*a*) for a subscriber identification (ID) signal in an environment of a first one of said communications terminals and determining (12*a*):
        (i) said ID signal is sensed and executing a step (b); or
        (ii) said ID signal is not sensed and executing a step (d);
    (b) assigning (26) said first one of the communications terminals to said same subscriber;
    (c) sensing (28) for said subscriber ID signal in said environment of said first one of said communications terminals and determining (29):
        (i) said ID signal is sensed and re-executing step (c); or
        (ii) said ID signal is not sensed and executing said step (d);
    (d) assigning (14) a second one of said communications terminals to said same subscriber; and
    (e) sensing (15*a*) for said subscriber ID signal in said environment of said first one of said communications terminals and determining (15*b*):
        (i) said ID signal is sensed and executing step (b); or
        (ii) said ID signal is not sensed and re-executing said step (e).

8. The method according to claim 1, wherein at least one (12) of said telephone terminals (11, 12) is a hand-held telephone, and wherein, if a predetermined period of time has elapsed without detection of such subscriber identification, any incoming telephone call is routed by default to said hand-held telephone (12).

9. The method of claim 1, wherein said detecting step comprises
    detecting electromagnetic signals emanating from a unit (18) carried on the person of the subscriber.

10. The method of claim 9, wherein said detecting step comprises
    detecting inductive signals emanating from a unit (18) carried on the person of the subscriber.

11. The method of claim 1, wherein said detecting step comprises
    detecting sonic signals emanating from a unit (18) carried on the person of the subscriber.

12. The method of claim 1, wherein said detecting step comprises detecting an identifying personal characteristic of the subscriber.

13. A method of selecting one of at least two telephone terminals (11, 12) assigned or assignable to a particular subscriber,
    comprising the steps of detecting, in at least one (11) of said telephone terminals, the voice of the subscriber as an identifying personal characteristic, and upon such identification of the subscriber, routing any incoming telephone call intended for said subscriber to that telephone terminal where such detection most recently occurred.

14. A method of selecting one of at least two telephone terminals (11, 12) assigned or assignable to a particular subscriber, comprising the steps of detecting, in at least one (11) of said telephone terminals, the appearance of the subscriber as an identifying personal characteristic, and upon such identification of the subscriber, routing any incoming telephone call intended for said subscriber to that telephone terminal where such detection most recently occurred.

* * * * *

UNITED STATES PATENT AND TRADEMARK OFFICE
CERTIFICATE OF CORRECTION

PATENT NO. : 6,128,502
DATED : October 3, 2000
INVENTOR(S) : Wizgall et al.

It is certified that error appears in the above-identified patent and that said Letters Patent is hereby corrected as shown below:

Title page,
Item [56], References Cited", after line 8, please insert the following:

-- 5,375,161    12/1994    Fuller et al.      379/211
   5,414,759    5/1995     Ishikuri et al.    379/211 --.

Signed and Sealed this

Eleventh Day of December, 2001

Attest:

NICHOLAS P. GODICI
*Attesting Officer*    *Acting Director of the United States Patent and Trademark Office*